United States Patent Office 3,117,014
Patented Jan. 7, 1964

3,117,014
AMYLACEOUS COMPOSITIONS FOR SHAPED
ARTICLES AND PROCESS
Eugene D. Klug, Wilmington, Del., assignor to Hercules
Powder Company, Wilmington, Del., a corporation of
Delaware
No Drawing. Filed Apr. 13, 1960, Ser. No. 21,884
17 Claims. (Cl. 106—213)

This invention relates to compositions which flow under heat and pressure and which are water soluble, and more particularly to such compositions comprising a derivative of an amylaceous material, a plasticizer therefor and water. One aspect of the invention relates to making shaped articles from said compositions.

By amylaceous material as used herein is meant any of the forms of starch, e.g. wheat, corn, sorghum, potato, tapioca, waxy maize, or amylose or amylopectin alone or any combination of amylose and amylopectin.

In defining the compositions of this invention the amount of plasticizer is expressed herein as percent by weight of the derivative of the amylaceous material as the derivative is normally dried in preparation; such dried derivatives contain about 1%–5% water. The percent water is expressed herein as percent by weight of the derivative of the amylaceous material on a bone dry basis.

An object of the present invention is to provide a composition which flows under heat and pressure and which is water soluble. A further object is to provide such a composition containing a derivative of an amylaceous material, a plasticizer therefor and water, the amount of water being 1%–20% by weight of said derivative on a bone dry basis. A still further object is to provide such a composition which can be worked from a hot melt. Another object is a process of making shaped articles from such a composition comprising subjecting said composition to heat and pressure while maintaining said moisture content.

The above and other objects will become apparent from the description of this invention given hereinafter.

The above and other objects are accomplished according to the present invention by providing a composition which flows under heat and pressure and which is water soluble comprising (1) a derivative of an amylaceous material, (2) a plasticizer for said derivative, and (3) water, the amount of water being 1%–20% by weight of said derivative on a bone dry basis.

The following examples illustrate various embodiments of the present invention, but it is not intended to limit the invention thereto except as defined in the claims of this application. MS is used herein to mean the moles of etherifying agent (e.g., alkylene oxide) combined per anhydroglucose unit of the starch molecule and is determined by the familiar Zeisel-Morgan method.

The following examples show a large number of compositions within the scope of this invention. In order to determine how various such compositions perform, the amount of plastic flow of the composition was determined under the application of heat and pressure in an Olsen Bakelite flow tester. This is a standard testing device widely used in the plastics industry. It is described in ASTM method D569–46A (ASTM Standards, 1958, Part 9, page 393). This device is perhaps more often referred to in the art as the Tinius Olsen flow tester.

For these plastic flow tests, very uniform mechanical mixtures of the derivative and plasticizer were made. By heat and pressure, the material was fused into a plastic mass. This mass was ground to a fine powder and conditioned generally at 25° C. and 50% R.H. for about 24 hours. Cylindrical pellets ⅜" x ⅜" were formed from this powder in a pelleting machine. The pellet was placed in the Tinius Olsen flow tester and the plastic flow thereof measured under the conditions shown in the examples.

The water content of the molding powders was determined by modification of the method described in Mitchell and Snell, Aquametry, pages 178–179 (1958), Interscience Publishers, New York City. Thus a 2.5 gram sample of the molding powder was mixed with enough methanol to fill a 100 ml. volumetric flask. This was allowed to stand at about 25° C. for 45 minutes. Then an aliquot was analyzed by the Johansson modification of the Karl Fischer method (see the above Mitchell and Snell reference).

In the following tables various abbreviations are used as a matter of convenience:

HPS is hydroxypropyl starch
HPA is hydroxypropyl amylose
HPAP is hydroxypropyl amylopectin
CMS is carboxymethyl starch
CMA is carboxymethyl amylose
CMAP is carboxymethyl amylopectin
AS is acetyl starch
AA is acetyl amylose
AAP is acetyl amylopectin
Methyl S is methyl starch
MA is methyl amylose
MAP is methyl amylopectin
CMHPS is carboxymethyl hydroxypropyl starch
MHPS is methyl hydroxypropyl starch
AHPS is acetyl hydroxypropyl starch The amylopectin derivatives were prepared from a commercial grade of waxy maize starch. The amylose derivatives were prepared from a commercial grade of amylose obtained by fractionation of potato starch. All derivatives prepared from starch, i.e. the HPS, HES, CMS, AS, Methyl S, CMHPS, MHPS, and AHPS were prepared from a commercial grade of wheat starch containing about 25% amylose and 75% amylopectin.

TABLE 1

Examples 1–8.—Effect of MS

| Example No. | Derivative Type | MS | Plasticizer | | H₂O, percent [1] | Extrusion | | Flow, inches/ 2 mins. |
|---|---|---|---|---|---|---|---|---|
| | | | Type | Amt., percent | | Temp., °C. | Pressure, p.s.i. | |
| 1 | HPS | 0.13 | Propylene glycol | 10 | | 120 | 540 | 0.49 |
| 2 | HPS | 0.23 | do | 10 | | 100 | 540 | 1.1 |
| 3 | HPS | 0.44 | do | 10 | | 100 | 540 | 1.4 |
| 4 | HPS | 0.58 | do | 10 | | 100 | 540 | 1.8 |
| 5 | HPA | 0.26 | do | 10 | | 150 | 540 | 0.56 |
| 6 | HPA | 0.42 | do | 10 | | 150 | 540 | 0.92 |
| 7 | HPAP | 0.21 | do | 10 | | 100 | 340 | 0.66 |
| 8 | HPAP | 0.34 | do | 10 | | 100 | 340 | 1.02 |

[1] Plasticized derivatives conditioned at 50% R.H. and 25 °C. for 24 hours and flow tested immediately.

TABLE 2

*Examples 9–13.—Effect of Water*

| Example No. | Derivative Type | MS | Plasticizer Type | Amt., percent | $H_2O$, percent | Extrusion Temp., °C. | Extrusion Pressure, p.s.i. | Flow, inches/2 mins. |
|---|---|---|---|---|---|---|---|---|
| 9 | HPS | 0.58 | Propylene glycol | 20 | 1.4 | 100 | 540 | 1.5 |
| 10 | HPS | 0.58 | ----do---- | 20 | 3.6 | 100 | 540 | 5.5 |
| 11 | HPS | 0.44 | ----do---- | 20 | 2.7 | 100 | 540 | 1.0 |
| 12 | HPS | 0.44 | ----do---- | 20 | 6.3 | 100 | 540 | 5.9 |
| 13 | HPS | 0.44 | Glycerol | 20 | 7.1 | 100 | 540 | 5.5 |

TABLE 3

*Examples 14–22.—Use of Various Plasticizers*

| Example No. | Derivative Type | MS | Plasticizer Type | Amt., percent | $H_2O$, percent [1] | Extrusion Temp., °C. | Extrusion Pressure, p.s.i. | Flow, inches/2 mins. |
|---|---|---|---|---|---|---|---|---|
| 14 | HPS | .44 | Propylene glycol | 10 | | 100 | 540 | 1.4 |
| 15 | HPS | .44 | Diethylene glycol | 10 | | 100 | 540 | 1.7 |
| 16 | HPS | .44 | Dipropylene glycol | 10 | | 100 | 540 | 0.50 |
| 17 | HPS | .44 | Monoacetyl glycerol | 10 | | 110 | 540 | 0.72 |
| 18 | HPS | .44 | Diacetyl glycerol | 10 | | 110 | 540 | 0.70 |
| 19 | HPS | .44 | Hydroxypropyl glycerol | 10 | | 110 | 540 | 0.52 |
| 20 | HPS | .44 | Aminoethyl ethanolamine | 10 | | 110 | 540 | 0.77 |
| 21 | HPS | .44 | Methyl diethanolamine | 10 | | 110 | 540 | 0.73 |
| 22 | HPS | .44 | Glycerol | 10 | | 100 | 540 | 2.1 |

[1] Plasticized derivatives conditioned at 50% R.H. and 25° C. for 24 hours and flow tested immediately. In each example the HPS had a viscosity of 210 cps. measured at 5% solids concentration in aqueous solution at 25° C. with a Brookfield Viscometer.

TABLE 4

*Examples 23–33.—Various Amounts of Plasticizer*

| Example No. | Derivative Type | MS | Plasticizer Type | Amt., percent | $H_2O$, percent | Extrusion Temp., °C. | Extrusion Pressure, p.s.i. | Flow, inches/2 mins. |
|---|---|---|---|---|---|---|---|---|
| 23 | HPS | 0.13 | Propylene glycol | 10 | (1) | 120 | 540 | 0.49 |
| 24 | HPS | 0.13 | ----do---- | 20 | (1) | 120 | 540 | 3.0 |
| 25 | HPS | 0.13 | Dipropylene glycol | 10 | (1) | 120 | 540 | 0.16 |
| 26 | HPS | 0.13 | ----do---- | 20 | (1) | 120 | 540 | 0.67 |
| 27 | HPS | 0.58 | Propylene glycol | 20 | (1) | 100 | 540 | 5.5 |
| 28 | HPS | 0.28 | Dipropylene glycol | 10 | (1) | 100 | 540 | 0.14 |
| 29 | HPS | 0.28 | ----do---- | 20 | (1) | 100 | 540 | 0.47 |
| 30 | HPS | 0.28 | Diethylene glycol | 10 | (2) | 100 | 540 | 0.37 |
| 31 | HPS | 0.28 | ----do---- | 20 | (2) | 100 | 540 | 1.5 |
| 32 | HPS | 0.28 | Glycerol | 10 | (2) | 100 | 540 | 0.28 |
| 33 | HPS | 0.28 | ----do---- | 20 | (2) | 100 | 540 | Too soft |

[1] Plasticized derivatives conditioned at 50% R.H. and 25° C. for 24 hours and flow tested immediately.
[2] Plasticized derivatives conditioned at 20% R.H. and 25° C. for 24 hours and flow tested immediately.

TABLE 5

*Examples 34–38.—Effect of Viscosity*

| Example No. | Derivative Type | Viscosity,[1] cps. | MS | Plasticizer Type | Amt., percent | $H_2O$, percent [2] | Extrusion Temp., °C. | Extrusion Pressure, p.s.i. | Flow, inches/2 mins. |
|---|---|---|---|---|---|---|---|---|---|
| 34 | HPS | 150 | 0.50 | Propylene glycol | 10 | | 100 | 540 | 1.08 |
| 35 | HPS | 125 | 0.50 | ---do--- | 10 | | 100 | 540 | 1.28 |
| 36 | HPS | 50 | 0.50 | ---do--- | 10 | | 100 | 540 | 1.49 |
| 37 | HPS | 16.5 | 0.50 | ---do--- | 10 | | 100 | 540 | 1.65 |
| 38 | HPS | 7.0 | 0.50 | ---do--- | 10 | | 100 | 540 | 5.3 |

[1] Measured at 5% solids concentration in aqueous solution at 25° C. with a Brookfield Viscometer, i.e., viscosity of 5% aqueous solution of the derivative.
[2] Plasticized derivatives conditioned at 50% R.H. and 25° C. for 24 hours and flow tested immediately.

TABLE 6

*Examples 39–54.—Use of Various Derivatives of Amylaceous Materials*

| Example No. | Derivative Type | MS [1] | Plasticizer | | Extrusion | | Flow, inches/ 2 mins. |
|---|---|---|---|---|---|---|---|
| | | | Type | Amt., percent | Temp., °C. | Pressure, p.s.i. | |
| 39 | HPS | 0.28 | Propylene glycol | 10 | 100 | 540 | 1.13 |
| 40 | HPA | 0.21 | ----do---- | 10 | 150 | 540 | 0.56 |
| 41 | HPAP | 0.26 | ----do---- | 10 | 100 | 340 | 0.66 |
| 42 | CMS | 0.87 | ----do---- | 20 | 100 | 540 | 3.8 |
| 43 | CMA | 1.05 | ----do---- | 20 | 150 | 540 | 0.21 |
| 44 | CMAP | 0.7 | ----do---- | 20 | 100 | 540 | 1.8 |
| 45 | AS | 0.44 | ----do---- | 10 | 100 | 540 | 2.0 |
| 46 | AA | 0.65 | ----do---- | 10 | 150 | 540 | 0.83 |
| 47 | AAP | 0.32 | ----do---- | 10 | 100 | 540 | 1.7 |
| 48 | Methyl S | 0.50 | ----do---- | 10 | 100 | 540 | 1.6 |
| 49 | Methyl A | 0.75 | ----do---- | 10 | 150 | 540 | 2.6 |
| 50 | Methyl AP | 0.39 | ----do---- | 10 | 100 | 540 | 2.1 |
| 51 | HES [2] | 1.15 | ----do---- | 20 | 100 | 540 | 11.0 |
| 52 | CMHPS | 0.10; 0.19 | ----do---- | 10 | 100 | 540 | 0.42 |
| 53 | MHPS | 0.25; 0.24 | ----do---- | 10 | 100 | 540 | 1.0 |
| 54 | AHPS | 0.20; 0.10 | ----do---- | 10 | 100 | 540 | 0.31 |

[1] For the mixed derivatives the MS of each substituent is given in the order in which the derivative is named e.g. the MS for the CMHPS means a carboxymethyl MS of 0.10 and a hydroxypropyl MS of 0.19.
[2] Hydroxyethyl starch (see page 3 for meaning of other derivative abbreviations).

The above examples show the effect of a number of variables on this invention. Examples 1–8 (Table 1) show that the plastic flow increases with increase in the MS of the derivative used in the composition. Examples 9–13 (Table 2) show that the plastic flow increases with increase in the water content of the composition. I have found that water is a necessary ingredient of the composition. While I may use about 1%–20% water by weight of the starch derivative on a bone dry basis, I prefer to use about 3%–8% of water. It is necessary to retain the moisture content within the 1%–20% range (preferably 3%–8%) during extrusion or other means of making useful articles from the composition. For example, I have found that it is necessary that the extruder be unvented. For example, as contrasted with this I have found that the use of hot two-roll mills, as commonly used in the art for processing other thermoplastic materials, is not satisfactory and forms a very brittle product because the water flashes off during processing.

Although a plasticizer is a necessary ingredient in my compositions in order for the compositions to be commercially attractive, the amount of plasticizer may vary widely and I have successfully used various amounts and numerous types of plasticizers. In general, while better results were obtained with the plasticizers in Examples 14–22 and 23–33 (Tables 3 and 4 above), I have also successfully used as plasticizers according to this invention hydroxyethyl morpholine, butyl carbitol and polyoxyethylene. As to amount of plasticizer, I have obtained excellent results with compositions containing 10%–20% plasticizer by weight of the derivative of the amylaceous material. Amounts outside this range of plasticizer may be used. For instance, for some commercial operations where very rapid flow rates are economically desirable, one may use amounts of plasticizer considerably greater than 20%. (See Examples 55–57 hereinafter.)

Examples 34–38 (Table 5) show that plastic flow increases with decrease in viscosity of the derivative. However, the outstanding advantage of this invention is realized irrespective of the viscosity of the derivative. That is, whether the viscosity of the derivative is low or high, in making the shaped articles of this invention I employ the compositions of my invention as a hot melt instead of an aqueous solution. In fact, aqueous solutions cannot be efficiently made into the shaped articles of this invention. Large amounts of water would have to be evaporated when using a solution. This would be commercially unacceptable not only from the standpoint of cost of removing the tremendous amount of water but also from the standpoint of drastically limiting the rate of making shaped articles from aqueous solutions.

The prior art has provided the derivatives used in this invention in various degrees of degradation. The prior art has used various means of degradation, including acid hydrolysis, oxidation, heat, light, high energy radiation, and enzymes. The means used to degrade the derivatives is immaterial insofar as the nature of the degraded product is involved, and all such means are applicable in my invention. The hydroxypropyl starch derivatives in Table 5 above were degraded by oxidation to the viscosities shown.

Some variation in flow may be obtained by varying the amount and type of plasticizer. However, I prefer to control with plasticizer the shaped article properties of flexibility, and resistance to curl, blocking and cracking, and to control with temperature and pressure the flow of the composition in making the shaped articles. Variation of the MS of the derivative may be used to control flow and also the above-mentioned properties of the shaped articles.

Examples 39–54 (Table 6) show the use of a large number of derivatives of amylaceous materials in accordance with this invention. However, my invention is applicable to derivatives of amylaceous materials broadly as defined hereinbefore. These include, e.g., the following water-soluble derivatives of amylaceous materials.

I. Ethers:
  (1) Saturated alkyl, including, e.g., methyl, ethyl, propyl
  (2) Unsaturated alkyl, e.g., vinyl, allyl
  (3) Hydroxyalkyl e.g., hydroxyethyl, hydroxypropyl
  (4) Carboxylalkyl, e.g., carboxymethyl, carboxyethyl, carboxypropyl
  (5) Cyanoalkyl, e.g., cyanoethyl II. Esters:
  (1) Saturated fatty acid, e.g., acetyl, propionyl
  (2) Unsaturated fatty acid, e.g., acrylyl III. Mixed derivatives comprising two or more of the ethers and/or esters in I and II above. Typical mixed derivatives are the carboxymethyl hydroxypropyl, methyl hydroxypropyl, ethyl hydroxyethyl, acetyl hydroxypropyl derivatives.

Table 7 hereinafter gives the broad and preferred MS ranges applicable to this invention. As one exceeds the preferred maximum MS the benefits realized from increased MS begin to level off, especially the hydroxyalkyl and carboxyalkyl derivatives. In the case of the alkyl and acetyl derivatives, one should not exceed an MS of about 1.5 because the product becomes less water soluble and more organosoluble such that at an MS of about 2 they are water insoluble and organosoluble and this would eliminate one of the chief advantages of the present invention.

TABLE 7
Broad and Preferred MS Ranges

| Derivative | Amylopectin | | Amylose-Amylopectin Mixture [1] | | Amylose | |
|---|---|---|---|---|---|---|
| | Broad MS | Preferred MS | Broad MS | Preferred MS | Broad MS | Preferred MS |
| Hydroxyalkyl | At least 0.1 | 0.2–0.6 | At least 0.1 | 0.2–0.6 | At least 0.3 | 0.5–1.0 |
| Carboxyalkyl | At least 0.5 | 0.8–1.5 | At least 0.5 | 0.8–1.5 | At least 1.0 | 1.2–1.8 |
| Alkyl | 0.3–1.5 | 0.5–1.2 | 0.3–1.5 | 0.5–0.8 | 0.6–1.5 | 0.8–1.2 |
| Acetyl | 0.3–1.5 | 0.5–1.2 | 0.3–1.5 | 0.5–0.8 | 0.6–1.5 | 0.8–1.2 |

[1] About 25% amylose–75% amylopectin mixture as usually appears in most starches.

This invention has a large number of applications wherein it excels. It may be used wherever there is a need for shaped articles, e.g., filaments, films, sheets, rods, tubes, capsules and containers in general or other such articles.

A very desirable property for many applications, which I have found that the articles made from the compositions of this invention have, is that of heat sealability. That is, by the application of slight pressure and heat, the material permanently heat seals or adheres to itself and various other materials. The following Examples 55–59 are specific applications of these.

Examples 55–57.—Films, Rods and Filaments

In order to prepare shaped articles in the form of films, a sample of hydroxypropyl amylose of 0.50 MS was intimately mixed with 50% propylene glycol by weight of the hydroxypropyl amylose. This was allowed to condition for 18 hours at 25° C. and 50% R.H. The resulting rubbery mass, which contained about 8% water, was extruded through a one-inch United States Rubber Machine extruder fitted with a 2-inch long slit 10 mils wide to form films. The films were extruded at a temperature of 300° F. and 52 r.p.m. screw speed. The films were smooth, colorless, tough, flexible and transparent. The thickness of the films varied from 6 to 2 mils depending on how much tension the films were subjected to during extrusion.

In order to prepare shaped articles in the form of rods, some of the extruded films were recycled through the extruder using a 1/16" diameter circular orifice at 250° F. and 32 r.p.m. screw speed. The rods had excellent flexibility and strength.

By applying tension to the rods during extrusion, which was done by winding the rods around a spindle, the size of the rods were drawn down to very fine filaments. These filaments had excellent flexibility and strength.

Example 58.—Sheets

In order to prepare shaped articles in the form of sheets a sample of hydroxyethyl starch of 0.89 MS was intimately mixed with 3% propylene glycol by weight of the hydroxypropyl starch. This was allowed to condition for 24 hours at 25° C. and 50% R.H. The resulting powdery mass, which contained about 8% water, was compression molded for three minutes between polished metal plates at 220° F. and 300 p.s.i. After cooling the molds to about 110° F. the molded sheets were removed. The molded sheets were about 10 mils thick, clear, smooth and transparent.

Example 59.—Sheets

Sheets were prepared as in Example 58 above using hydroxyethyl amylose of 0.50 MS and a molding temperature of 300° F. The sheets had substantially the same properties as the sheets of Example 58 but were significantly tougher.

Although all of the compositions of this invention are useful in making all of the shaped articles of this invention, for making shaped articles in which one desires high tensile strength and flexibility, I prefer to use compositions wherein the amylaceous material from which the derivative is made contains about 50%–90% amylose. The amylose-rich starches may be obtained by any of the standard methods of fractionation whereby the amylose and amylopectin in starches are separated, such as for example the fractionation method disclosed in P. G. Schoch, Advances in Carbohydrate Chemistry edited by W. W. Pigman and M. L. Wolfrom, page 247 (1945), Academic Press, New York City. I have obtained excellent results with a commercial product which contains approximately 90% amylose and 10% amylopectin and was obtained by fractionating potato starch. Also equally applicable are several other high amylose content starches which have recently become available.

As those skilled in this art will appreciate, various additional materials may be used with the compositions of this invention. These additional materials include, e.g., clay, pigments, fillers in general, dyes.

Likewise, the artisan will know that the various conventional techniques of preparing shaped articles are applicable in my invention; these techniques include, e.g., compression molding, injection molding, and extrusion.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. A composition consisting essentially of (1) a derivative of an amylaceous material selected from the group consisting of amylaceous (a) ethers, (b) esters, (c) mixed ether-esters, (d) mixed ethers and (e) any combination of (a), (b), (c), and (d), (2) a plasticizer for said derivative, and (3) water, the amount of water being 1%–20% by weight of said derivative on a bone-dry basis, the amount of plasticizer being at least about 3% by weight of said derivative, said plasticizer being selected from the group consisting of water-soluble and water-miscible plasticizers, said composition being further characterized by being water-soluble and by flowing under heat and pressure to form articles which are heat-sealable.

2. The composition of claim 1 wherein said derivative is the hydroxyalkyl derivative.

3. The composition of claim 1 wherein said derivative is the hydroxypropyl derivative.

4. The composition of claim 1 wherein said derivative is the hydroxyethyl derivative.

5. The composition of claim 1 wherein said derivative is the carboxyalkyl derivative.

6. The composition of claim 1 wherein said derivative is the carboxymethyl derivative.

7. The composition of claim 1 wherein said derivative is the alkyl derivative.

8. The composition of claim 1 wherein said derivative is the methyl derivative.

9. The composition of claim 1 wherein said derivative is the carboxyalkyl hydroxyalkyl derivative.

10. The composition of claim 1 wherein said derivative is the carboxymethyl hydroxpropyl derivative.

11. The composition of claim 1 wherein said derivative is the carboxymethyl hydroxypropyl derivative.

12. The composition of claim 1 wherein said derivative is the methyl hydroxypropyl derivative.

13. The composition of claim 1 wherein the amount of water is 3%–8%.

14. The composition of claim 1 wherein said plasticizer is propylene glycol.

15. The composition of claim 1 wherein said plasticizer is diethylene glycol.

16. The composition of claim 1 wherein said plasticizer is glycerol.

17. Process of making shaped articles from the composition of claim 1 in the form of a hot melt thereof, which process comprises subjecting said composition to heat and pressure while maintaining said water content, and forming said composition into an article of the shape desired.

References Cited in the file of this patent

UNITED STATES PATENTS

| | | |
|---|---|---|
| 2,530,439 | Molteni | Nov. 21, 1950 |
| 2,883,300 | Rickert | Apr. 21, 1959 |
| 2,973,243 | Kudera | Feb 28, 1961 |

OTHER REFERENCES

Kerr: Chemistry and Industry of Starch, 2nd Edition, Academic Press Inc., N.Y., 1950, page 298. (Copy in Scientific Library.)

UNITED STATES PATENT OFFICE
CERTIFICATE OF CORRECTION

Patent No. 3,117,014            January 7, 1964

Eugene D. Klug

It is hereby certified that error appears in the above numbered patent requiring correction and that the said Letters Patent should read as corrected below.

Column 5, line 39, for "unventer" read -- unvented --; column 9, line 6, for "carboxymethyl hydroxypropyl derivative" read -- alkyl hydroxyalkyl derivative --.

Signed and sealed this 16th day of June 1964.

(SEAL)
Attest:

ERNEST W. SWIDER
Attesting Officer

EDWARD J. BRENNER
Commissioner of Patents